May 9, 1961  M. F. RUDY  2,983,558
MICRO-BALL JOINT

Filed June 27, 1958  2 Sheets-Sheet 1

MARION F. RUDY,
INVENTOR.

BY *Lyon & Lyon*

ATTORNEYS

May 9, 1961 M. F. RUDY 2,983,558
MICRO-BALL JOINT
Filed June 27, 1958 2 Sheets-Sheet 2

MARION F. RUDY,
INVENTOR.

BY Lyon & Lyon

ATTORNEYS

United States Patent Office 2,983,558
Patented May 9, 1961

2,983,558
MICRO-BALL JOINT
Marion F. Rudy, 17411 Keswick St., Northridge, Calif.
Filed June 27, 1958, Ser. No. 745,053
8 Claims. (Cl. 308—194)

This invention relates to ball joint construction and is particularly directed to a device of this type in which two concentric spherical surfaces are spaced apart by a large number of very small diameter balls, thereby providing excellent self-aligning properties with a minimum of frictional resistance.

Conventional ball joint constructions using surface contact between a ball member and an enveloping socket member have relatively high static and sliding friction characteristics. Moreover, the metal-to-metal sliding contact under high loads in such designs is vulnerable to galling action with resultant failure. On the other hand, conventional spherical type bearing assemblies which use relatively few large diameter ball or roller elements provide only point or line contact areas, and Brinelling action is possible under high loads.

It is the principal object of this invention to overcome these difficulties by employing a large number of very small balls between inner and outer concentric spherical surfaces of a ball joint device, the construction being particularly adapted for service at low rates of rotation.

Another object is to provide a device of this type in which a path of escape is provided for the small size balls when the bearing structure is operated in a misalignment plane. This track is formed by a circumferential relieved area in the outer spherical surface. Another object is to provide such a device wherein a joint between parts forming the outer race lies in a plane containing the axis of rotation. Another object is to provide a micro-ball joint structure in which the outer race is formed by two parts meeting in a plane normal to the axis of rotation. Another object is to provide a ball-joint device in which small diameter balls are interposed between inner and outer concentric spherical surfaces, and wherein the member forming the inner spherical surface is formed in two parts with a joint in a plane containing the axis of rotation.

Another object is to provide a device of this type which is particularly well suited to economical manufacture on a quantity production basis.

Other objects and advantages will appear hereinafter.

Figure 1:
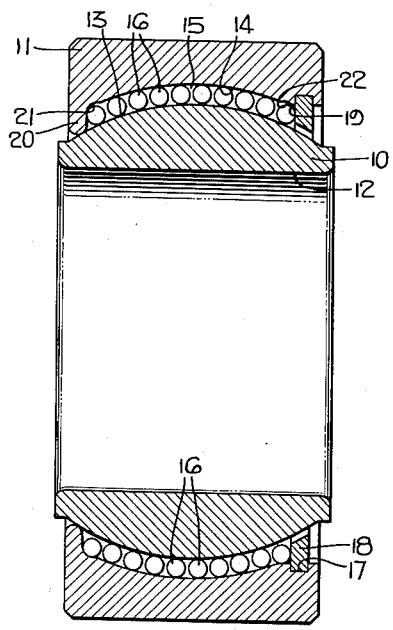
Figure 1 is a sectional view showing a preferred embodiment of my invention.
Figure 2:
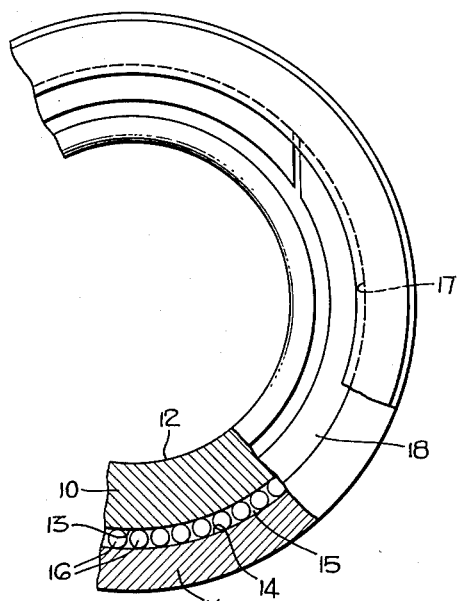
Figure 2 is a side elevation thereof partly broken away and partly in section.
Figure 3:
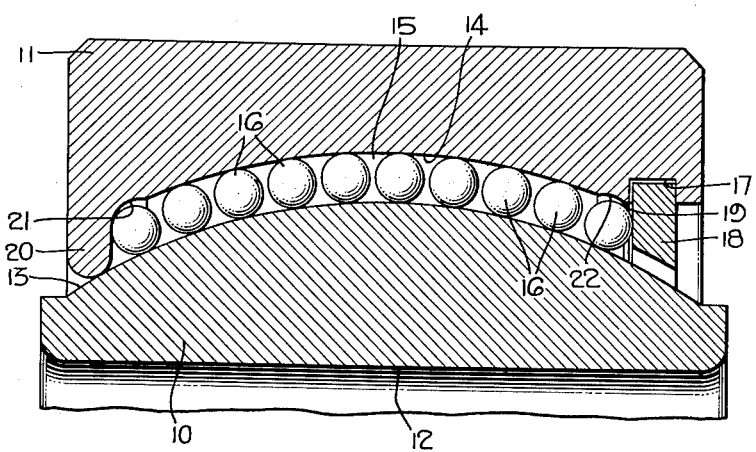
Figure 3 is a sectional elevation on an enlarged scale.

Referring to the drawings, the preferred form of my invention shown in Figures 1 and 2 comprises a micro-ball joint or self-aligning bearing assembly having an inner member 10 and an enveloping outer member 11.

The inner member has an axial bore 12 to receive a rod or shaft (not shown). The inner member 10 has an external spherical surface 13. The outer member 11 has an internal spherical surface 14. The surfaces 13 and 14 are concentric and the space 15 between them is substantially filled by a large number of very small steel balls 16.

The outer member 11 is provided with an annular recess 17 at one side and this recess receives a split retainer ring 18. This retainer ring 18 serves as a flange to close an annular opening through which the balls 16 are introduced into the space 15 between the spherical surfaces 13 and 14. The inner diameter of the lip 19 on the outer member 11 adjacent the retainer ring 18 is equal to or slightly greater than the diameter of the spherical surface 13 on the inner member 10. Accordingly, the parts of the device can be assembled by moving the outer member 11 in an axial direction with respect to the inner member 10, and then filling the space 15 with balls 16 through the opening normally closed by the retainer ring 18. Installation of the retainer ring 18 then prevents disassembly.

The space 15 between the surfaces 13 and 14 and between the retainer ring 18 and the flange 20 is substantially filled with a large number of balls 16. When the device is operated in a position of misalignment, that is, when the parallel planes of the retainer ring 18 and flange 20 are disposed at an angle to the axis of the bore 12, a path of escape must be provided for the balls 16 which contact the flange 20 or the retainer ring 18. The escape track is provided by a circumferential undercut or relieved area 21 adjacent the flange 20 and a similar undercut or relieved area 22 adjacent the lip 19. The depth of the undercut is not so large that the balls can pile up on top of one another and in practice may be very little more than a slight deviation from the spherical surface 14.

The balls 16 in the circumferential channels as thus provided do not carry any load. Skidding or sliding motion of the load-carrying balls is avoided because these balls are free to roll and cannot jam in a wedging action against the flange 20 or retainer ring 18. At least three rows of load carrying balls 16 are required in addition to the balls in the undercut channels 21 and 22. I prefer, however, to use more than three rows. In a particular installation, eight rows of hardened and ground steel balls one-millimeter in diameter are used in the load-carrying positions in addition to the end rows adjacent the undercuts 21 and 22. In this particular bearing assembly the outer diameter of the outer member is one-and-one-eighth inches, and its axial length is one-half inch. The diameter of the internal spherical surface 14 is 0.959 inch.

In operation, true anti-friction bearing properties are provided in all directions of misalignment, within the range of operation, as well as when the parts are rotated in axial alignment.

Figure 4:
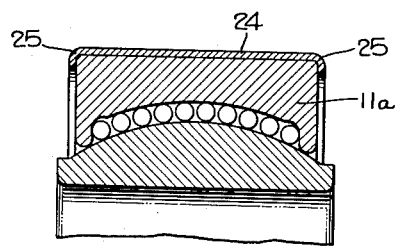
Figure 4 is a sectional detail showing a modification.
Figure 5:
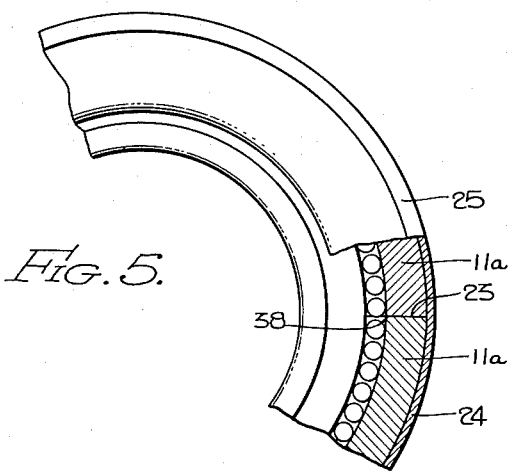
Figure 5 is a side elevation thereof partly broken away and partly in section.

In the modified form of my invention shown in Figures 4 and 5, the parts are the same as those previously described except that the retainer ring 18 is omitted, and the outer member 11a is formed of two identical semicircular parts having an axially extending joint 23. The two parts 11a are held in place by an outer retainer 24 having crimped edges 25.

Figure 6:
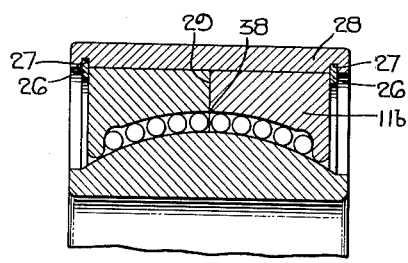
Figure 6 is a sectional detail showing a second modification.

In the form of my invention shown in Figure 6, the outer member 11b is split in a radial plane 29 and the two halves are held in assembled relationship by means of split retainer rings 26 mounted in grooves 27 provided in the shell 28.

Figure 7:
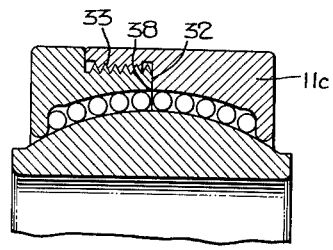
Figure 7 is a similar view showing a third modification.

In the modified form of my invention shown in Figure 7, the outer member 11c is formed of two parts meeting in face-to-face contact at a joint in a radial plane 32.

The parts of the outer member are connected by axial threads 33.

In other respects the construction and operation of these two modifications are the same as described in connection with Figures 1 and 2.

Figure 8:
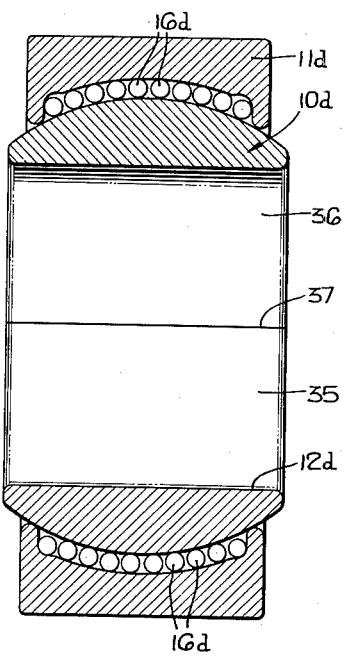
Figure 8 is a sectional elevation showing a further modification.
Figure 9:
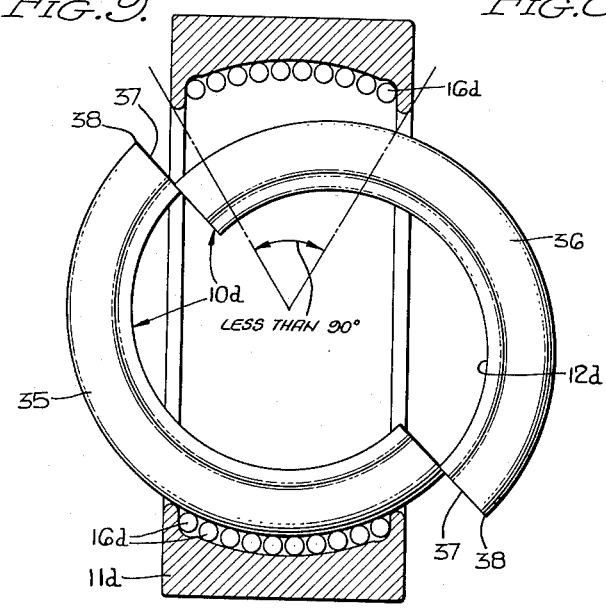
Figure 9 is a side elevation partly in section of the device shown in Figure 8, the upper half of the split inner member being turned 180° along the joint and dropped into the half bore in the lower half of the split inner member, to illustrate the manner of assembly.

In the form of my invention shown in Figures 8 and 9, the outer member 11d is formed as a single integral member while the inner member 10d is formed in two parts 35 and 36 split along an axial plane 37.

Figure 8 shows how the two parts 35 and 36 may be assembled into the one-piece outer member 11c. The small diameter balls 16d are first placed in position within the ring 11d and held in place by heavy grease. The part 35 of the inner member 10d is then placed in an oblique position as shown. The duplicate half 36 is then inserted at an angle along the plane of the joint in the manner shown in Figure 9. The parts 35 and 36 are then rotated 90° to bring them to the operative position shown in Figure 8. It will be noted that the arcuate length of the internal surface of the member 11d measured in a radial plane is less than 90°, to permit assembly as described.

In each of the constructions where a joint occurs in one of the spherical surfaces which confine the small diameter balls, and as shown in Figures 5, 6, 7 and 9, the corners of the split members along the joints in the spherical surfaces are slightly relieved or chamfered as shown at 38 to prevent breakage of the sharp edges by the action of the rolling balls, as well as to prevent damage to the balls.

Having fully described my invention, it is to be understood that I do not wish to be limited to the details herein set forth, but my invention is of the full scope of the appended claims.

I claim:

1. In a device of the class described, the combination of: an inner member having an external surface constituting a portion of a sphere, an outer member having an internal surface constituting a portion of a sphere, the spheres being concentric and defining a space between them, a large number of very small diameter balls substantially filling said space and engaging both of said surfaces, means on the outer member providing parallel flanges preventing lateral escape of balls from said space, and the internal surface of the outer member being relieved circumferentially to form a channel adjacent each of the flanges.

2. In a device of the class described, the combination of: an inner member having an external surface constituting a portion of a sphere, an outer member having an internal surface constituting a portion of a sphere, the spheres being concentric and defining a space between them, a large number of very small diameter balls substantially filling said space and engaging both of said surfaces, means on the outer member providing parallel flanges preventing lateral escape of balls from said space, one of the flanges being removable, and the internal surface of the outer member being relieved circumferentially to form a channel adjacent each of the flanges.

3. The combination set forth in claim 2 in which the removable flange comprises a split retainer ring received in a groove in the outer member.

4. In a device of the class described, the combination of: an inner member having an external surface constituting a portion of a sphere, an outer member having an internal surface constituting a portion of a sphere, the spheres being concentric and defining a space between them, a large number of very small diameter balls substantially filling said space and engaging both of said surfaces, the outer member being split into two halves along an axial plane, a shell encircling the halves of the outer member to maintain them in position, means on each of the outer member halves providing parallel flanges preventing lateral escape of balls from said space, and the internal surface of the outer member being relieved circumferentially to form a channel adjacent each of the flanges.

5. In a device of the class described, the combination of: an inner member and an outer member each having a surface constituting a portion of a sphere, the spheres being concentric and defining a space between them, a large number of very small diameter balls substantially filling said space and engaging both of said surfaces, one of the members being split into two halves whereby a joint is formed in one of said spherical surfaces, adjacent edges of said member along said joint being chamfered, means providing parallel flanges on one said outer member preventing lateral escape of balls from said space, and the internal surface of the outer member being relieved circumferentially to form a channel adjacent each of the flanges.

6. In a device of the class described, the combination of: an inner member having an external surface constituting a portion of a sphere, an outer member having an internal surface constituting a portion of a sphere, the spheres being concentric and defining a space between them, a large number of very small diameter balls substantially filling said space and engaging both of said surfaces, the outer member being split into two halves along a radial plane, means including a shell encircling the halves of the outer member to maintain them in position, each half of the outer member having a flange to prevent lateral escape of balls from said space, and the internal surface of the outer member being relieved circumferentially to form a channel adjacent each of the flanges.

7. In a device of the class described, the combination of: an inner member having an external surface constituting a portion of a sphere, an outer member having an internal surface constituting a portion of a sphere, the spheres being concentric and defining a space between them, a large number of very small diameter balls substantially filling said space and engaging both of said surfaces, the outer member being formed of two parts positioned in face to face contact along a radial plane, means interengaging axially extending threads for maintaining said members in such contact, a flange on each of said parts of the outer member cooperating to prevent lateral escape of balls from said space, and the internal surface of the outer member being relieved circumferentially to form a channel adjacent each of the flanges.

8. In a device of the class described, the combination of: an inner member having an external surface constituting a portion of a sphere, a one-piece outer member having an internal surface constituting a portion of a sphere, the spheres being concentric and defining a space between them, a large number of very small diameter balls substantially filling said space and engaging both of said surfaces, end flanges on said outer member preventing lateral escape of balls from said space, the internal surface of said outer member being relieved circumferentially to form a channel adjacent each of said end flanges, the inner member being split into two halves along an axial plane, the arcuate length of said internal surface in a radial plane being less than 90° to permit assembly of the halves of the inner member into the one-piece outer member.

References Cited in the file of this patent

UNITED STATES PATENTS

| 515,379 | Titcomb | Feb. 27, 1894 |
| 637,206 | Heath | Nov. 14, 1899 |
| 1,233,476 | Hughes | July 17, 1917 |
| 1,439,486 | Schmidt | Dec. 19, 1922 |
| 1,511,480 | Knowles | Oct. 14, 1924 |
| 2,812,224 | Richmond | Nov. 5, 1957 |

FOREIGN PATENTS

| 26,332 | Great Britain | Dec. 18, 1905 |
| 360,592 | Germany | Oct. 5, 1922 |
| 363,532 | Germany | Nov. 10, 1922 |
| 553,067 | Great Britain | May 6, 1943 |